United States Patent
Uchida et al.

(10) Patent No.: US 7,019,714 B2
(45) Date of Patent: Mar. 28, 2006

(54) MOBILE TERMINAL PROVIDED WITH ORGANIC ELECTROLUMINESCENT AND LIQUID CRYSTAL DEVICES

(75) Inventors: Masahiro Uchida, Nagano-ken (JP); Hayato Nakanishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 369 days.

(21) Appl. No.: 10/046,183

(22) Filed: Jan. 16, 2002

(65) Prior Publication Data

US 2002/0097194 A1 Jul. 25, 2002

(30) Foreign Application Priority Data

Jan. 17, 2001 (JP) ............................. 2001-008712
Jan. 15, 2002 (JP) ............................. 2002-006222

(51) Int. Cl.
*G09G 5/00* (2006.01)
(52) U.S. Cl. ..................... 345/3.1; 345/211; 455/572
(58) Field of Classification Search ................. 345/76, 345/3.1, 55, 77–81, 1.1, 1.3, 4, 169, 211, 345/212; 455/572–574, 556.1, 556.2, 566
See application file for complete search history.

(56) References Cited

U.S. PATENT DOCUMENTS

| | | | | |
|---|---|---|---|---|
| 5,475,402 A | * | 12/1995 | Hijikata | ........................ 345/211 |
| 5,493,690 A | * | 2/1996 | Shimazaki | ............... 455/575.3 |
| 5,736,754 A | * | 4/1998 | Shi et al. | ...................... 345/83 |
| 5,815,228 A | * | 9/1998 | Flynn | ........................... 349/71 |
| 5,841,431 A | | 11/1998 | Simmers | |
| 6,014,573 A | * | 1/2000 | Lehtonen et al. | ........ 455/569.1 |
| 6,069,593 A | | 5/2000 | Lebby et al. | |
| 6,144,358 A | * | 11/2000 | Narayanaswamy et al. | . 345/173 |
| 6,459,199 B1 | | 10/2002 | Kido et al. | |
| 6,473,058 B1 | * | 10/2002 | Hotomi et al. | ................ 345/1.1 |
| 6,574,487 B1 | * | 6/2003 | Smith et al. | ................. 455/566 |
| 6,885,360 B1 | * | 4/2005 | Hara et al. | ................... 345/102 |
| 6,912,664 B1 | * | 6/2005 | Ranganathan et al. | ...... 713/320 |
| 2001/0003707 A1 | * | 6/2001 | Moriya | ........................ 455/566 |
| 2002/0163606 A1 | * | 11/2002 | Kitai et al. | .................... 349/98 |
| 2003/0156074 A1 | * | 8/2003 | Ranganathan et al. | ....... 345/1.1 |

FOREIGN PATENT DOCUMENTS

EP 0 798 650 A2 10/1997

(Continued)

OTHER PUBLICATIONS

Chinese Office Action dated Apr. 2, 2004.

*Primary Examiner*—Amare Mengistu
(74) *Attorney, Agent, or Firm*—Oliff & Berridge, PLC

(57) ABSTRACT

The invention provides an electronic apparatus that provides an organic electroluminescent device and a liquid crystal device. In a mobile terminal electronic apparatus, such as an electronic apparatus having a device that displays, and in particular, a mobile telephone that has power consumption restrictions, includes an organic electroluminescent device, which provides fine display having superior visibility, and a transflective or reflective liquid crystal display device, which severely reduces power consumption, and thereby achieves low power consumption while not in use, and allows selective use of displays depending on the type of information, such as video or still images, and the condition of the remaining battery charge, or the like.

12 Claims, 9 Drawing Sheets

FOREIGN PATENT DOCUMENTS

| | | |
|---|---|---|
| JP | 10-078582 | 3/1998 |
| JP | 10-189237 | 7/1998 |
| JP | 10-253959 | 9/1998 |
| JP | 11153826 A * | 6/1999 |
| JP | A-2000-105573 | 4/2000 |
| JP | 2000-253113 | 9/2000 |
| KR | 1998-024347 | 7/1998 |
| KR | 2000-0011034 | 2/2000 |

* cited by examiner

MOBILE TERMINAL PROVIDED WITH ORGANIC ELECTROLUMINESCENT AND LIQUID CRYSTAL DEVICES

BACKGROUND OF THE INVENTION

1. Field of Invention

The present invention relates to an electronic apparatus provided with an organic electroluminescent (hereinafter "EL") device that displays. The invention also relates to a liquid crystal device that displays.

2. Description of Related Art

An organic EL display has many advantageous properties as a display compared to a liquid crystal display, such as high response speed, wide directionality, good viewing characteristic properties of natural light emitting elements, and in addition, the organic EL display has a wide operating temperature range. Therefore, the use of organic EL displays is currently being studied for use in numerous electronic apparatus that require a display.

Japanese Unexamined Patent Application, First Publication, No. 12-105573 discloses a related art technology that uses an organic EL display as a display of an electronic apparatus. This publication discloses a technology in which an organic EL display is used in an electronic apparatus, such as portable terminal apparatus, and when the apparatus is not manipulated, or in the case of the portable terminal apparatus, when the apparatus is on stand-by, only the minimal necessary information is displayed.

However, in the related art technology described above, even if only the minimal necessary information is displayed when the apparatus is not in use, or in the case of the portable terminal apparatus, when the apparatus is on stand-by, a firm current must continuously flow in order to always drive the organic EL display. The energy consumption to drive the organic EL display is larger than that for a reflective or transflective liquid crystal display, and thus when the electronic apparatus that has an organic EL display is not in use, and in particular, when a mobile terminal, such as a portable telephone is on stand-by, the battery consumption is severe.

SUMMARY OF THE INVENTION

In consideration of the problem described above, an object of the present invention is to reduce the power consumption when an electronic apparatus that has a mounted organic EL display is not in use, or in the case of a mobile terminal, such as a portable telephone, is on stand-by.

An electronic apparatus in accordance with the present invention includes an organic electroluminescent device that displays including organic electroluminescent elements in which at least one organic light emitting layer is interposed between an anode and a cathode. The invention also provides a liquid crystal device that displays.

According to the above structure, the electronic apparatus includes the organic EL device, which has a high energy consumption but allows superior image displays or video displays, and a liquid crystal device, which can display information at a low energy consumption, that are selectively used depending on necessity. It is thereby possible for the electronic apparatus to realize low energy consumption even when the organic EL device is mounted.

This electronic apparatus can be a mobile terminal.

According to the above structure, it is possible to use an electronic apparatus that includes a mobile terminal, such as a portable telephone whose battery capacity is limited, for a long time by selectively using the organic EL device and the liquid crystal device as necessary.

In this electronic apparatus, when not manipulated for a predetermined period or during stand-by, the organic electroluminescent device is in a non-display mode and only the liquid crystal device is in the display mode.

According to the above structure, in an electronic apparatus that must display any sort of information while the apparatus is not in use, and in particular, in a mobile terminal, such as a portable telephone that must display the time or the like even while on stand-by, the consumption of power is greatly reduced by only driving the liquid crystal device while not driving the organic EL device which is not in use or during stand-by.

In this electronic apparatus, the device can be driven by an active matrix driving method.

According to the above structure, since the organic EL device is driven by an active matrix driver controlled, for example, by a low temperature polysilicon TFT, it is possible to realize the low energy consumption, and it is possible to increase the service life of the organic EL elements. Furthermore, it is possible to provide still images and dynamic images having superior visibility.

In this electronic apparatus, the liquid crystal device can be a translucent reflective liquid crystal display device.

According to the above structure, since the liquid crystal device is a transflective liquid crystal display device, it is not necessary to provide illumination, such as a backlight at a bright location, and the energy efficiency can be enhanced.

In this electronic apparatus, a reflective liquid crystal display device can be used as the liquid crystal device.

According to the above structure, since the liquid crystal device is a reflective type liquid crystal device, it is not necessary to provide illumination, such as a backlight at a bright location, and thus even at a dark location, if a front light, for example, is used, a very bright illumination is not necessary, and thus low energy consumption is realized. Furthermore, when a front light is used instead of the back light, the liquid crystal device can be made to be thin.

In this electronic apparatus, the liquid crystal device can be driven by a simple matrix driving method.

According to the above structure, because the liquid crystal device is driven by a simple matrix driving method, the liquid crystal device can be provided at low cost.

In this electronic apparatus, the liquid crystal device can be driven by an active matrix driving method.

According to the above structure, since the liquid crystal device is driven by an active matrix driving method, it is possible to increase the image display capacity of the liquid crystal device, and thereby it is possible to execute advanced selective use of the organic EL device or the liquid crystal device based on the type of the information, such as still or dynamic images, the remaining battery capacity, the presence or absence of an electronic charging apparatus, or the like.

In this electronic apparatus, the liquid crystal device can be a monochrome display.

According to the above structure, since a monochrome display is selected as the liquid crystal device, the liquid crystal device can be provided at low cost.

In this electronic apparatus, a color display can be selected as the liquid crystal device.

According to the above structure, since a color display is selected as the liquid crystal device, it is possible to increase the image display capacity of the liquid crystal device, and thereby it becomes possible to execute the advanced selective use of the organic EL device and the liquid crystal device based on the type of the information, such as video or still image, the remaining battery capacity, the presence or absence of an electronic charging apparatus, or the like.

In this electronic apparatus, an organic EL device can be used as the light source for the liquid crystal device.

According to the above structure, since the above organic EL device is used as the linear light source or the surface light source for the liquid crystal device, a device that has uniform luminescence and superior visibility can be provided, and the energy consumption can be severely reduced.

In this electronic apparatus, a device can be provided to switch the device between the liquid crystal device and the organic EL device.

According to the above structure, the above organic EL element is provided with a device that switches the device between the liquid crystal device and the organic EL device. It thereby becomes possible to execute an advanced selective use of the organic EL device and the liquid crystal device based on the type of the information, such as video or still image, the remaining battery capacity, the presence or absence of an electronic charging apparatus, or the like.

In this electronic apparatus, a device is provided which suspends the display of the organic EL device, and automatically switches the display of the liquid crystal device when the remaining charge of the battery provided in the electronic apparatus reaches a predetermined remaining charge. According to the above structure, since a device is provided that suspends the above organic EL device which has a larger energy consumption than that of the transflective or reflective liquid crystal display device, the period of time to drive the electronic apparatus by a battery that has a certain capacity can be lengthened by limiting the driving time of the organic EL device.

In this electronic apparatus, a device is provided in the electronic apparatus that can automatically switch the device to display from the organic EL device to the liquid crystal device when the organic EL device is continuously driven while the organic EL device is not manipulated for a predetermined time.

According to the above structure, the time of using the electronic apparatus that is driven by a battery, having a certain capacity, can be lengthened by limiting the use of the organic EL device while the electric apparatus is not used.

DETAILED DESCRIPTION OF PREFERRED EMBODIMENTS OF THE INVENTION

First Embodiment

Figure 1:
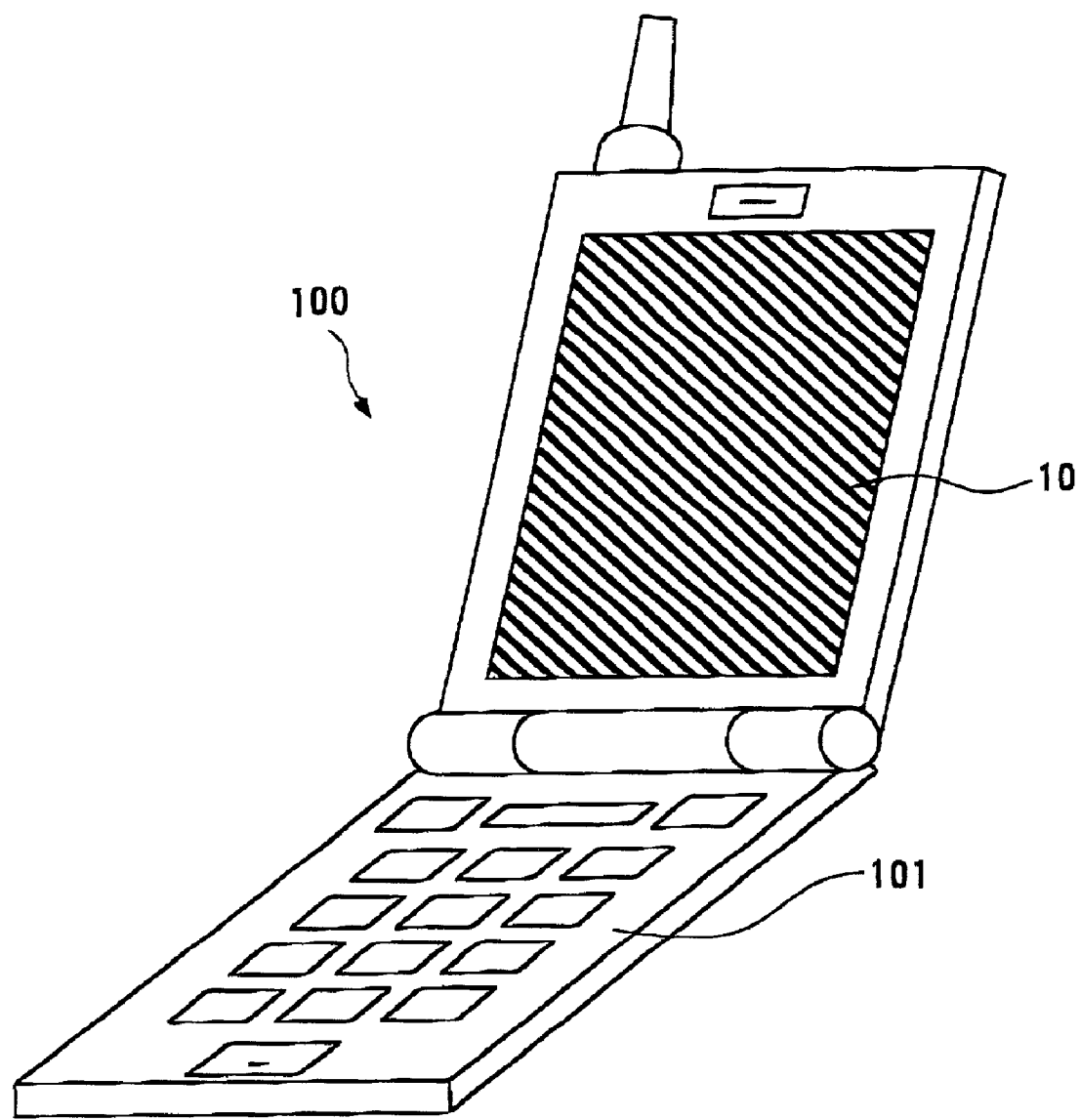
FIG. 1 is a schematic perspective view of an electronic apparatus of the present invention.
Figure 2:
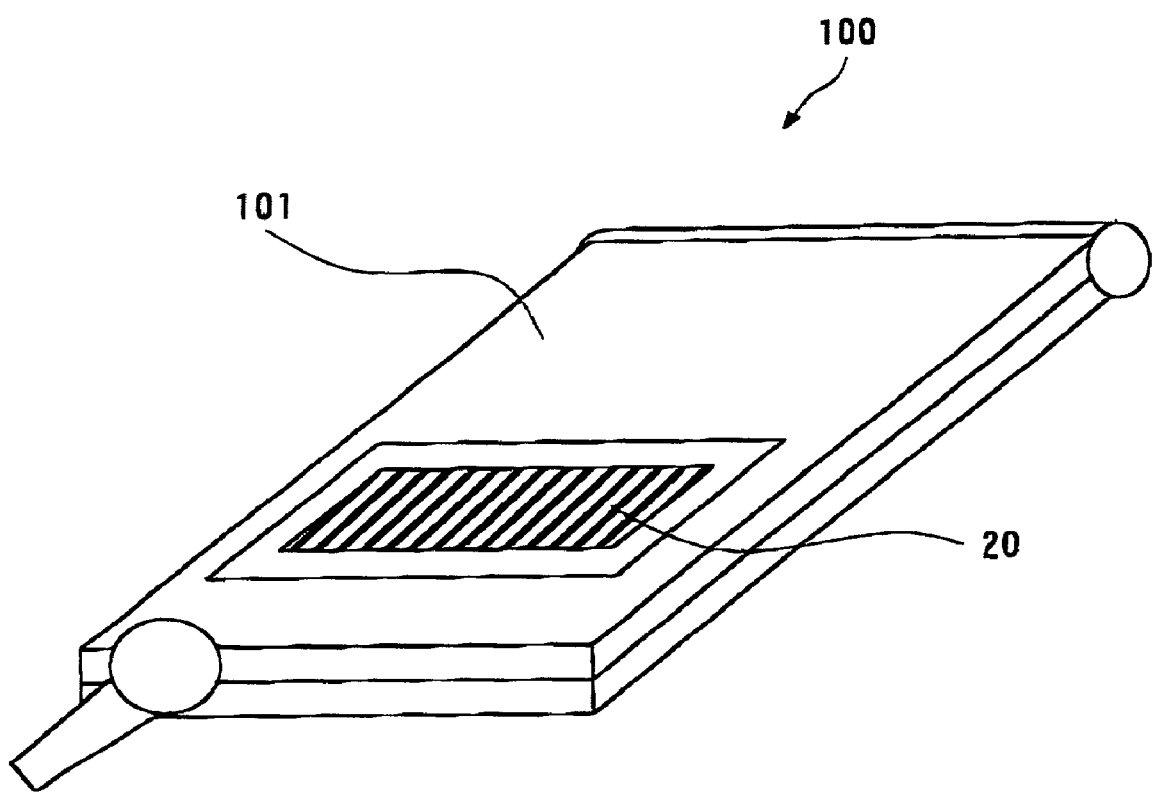
FIG. 2 is a schematic perspective view of an electronic apparatus of the present invention.

Below, a first embodiment of the present invention will be explained with reference to the figures. FIG. 1 is a schematic perspective view of a mobile terminal electronic apparatus of the present embodiment. FIG. 2 is a schematic perspective view of the mobile terminal electronic apparatus of the present embodiment shown in a folded state.

The mobile terminal electronic apparatus (portable telephone) 100 in the present embodiment includes a mobile terminal electronic apparatus body 101, an organic EL device (hereinafter "organic EL panel") 10 that is a full color active matrix display, and a transflective liquid crystal display device (hereinafter a "liquid crystal panel") for monochrome display by a simple matrix driver.

In the organic EL panel 10 in the present embodiment, red, green, and blue light emitting organic EL elements are each patterned on the low temperature polysilicon TFT substrate, and along with the driver circuit board, are disposed as essential display parts of the mobile terminal electronic apparatus. A full color display is possible because organic EL elements respectively corresponding to the three red, green, and blue colors are patterned in each pixel. There are no particular limitations on the resolution and gradations of the organic EL panel, but to make it possible to provide a high definition, smooth, moving display, a resolution of QVGA or higher having 320×200 pixels and 16 or more gradations for each of the colors is preferable.

Here, the organic EL panel 10 includes organic EL elements, a sealant, and a sealing substrate, where the organic EL elements have an organic phosphorescent layer interposed between an anode and a cathode that are laminated on one surface of a TTF substrate in a predetermined sequence.

The anode of the organic EL panel 10 includes a conductive transparent material, such as ITO (Indium Tin Oxide) or IZO (Indium Zinc Oxide), and is formed, for example, by a sputtering method.

The cathode of the organic EL panel 10 includes a metal having a low work function, such as cadmium (Cd), magnesium (Mg), lithium (Li), and barium (Ba). Furthermore, in order to increase the oxidation resistance and the conductivity, preferably metals or metal oxides that are oxidation resistant and electronically conducting, such as aluminum (Al), gold (Au), silver (Ag), tantalum (Ta), ITO, IZO and the like are laminated or alloyed on the cathode. Here the cathode is formed by a vacuum vapor deposition method or a sputtering method.

In this case, because light is emitted from the cathode side, that is, from the substrate side, the organic EL panel is disposed in the electronic apparatus such that the substrate side faces the side of the user of the electronic terminal.

Moreover, in the organic EL panel, the cathode can be formed by a transparent material. In this case, because the light is emitted from the side opposite to the substrate (the sealing substrate side), the organic EL panel is disposed in the electronic apparatus such that the sealant substrate side faces the side of the user of the electronic apparatus. In this case, the anode does not need to be transparent.

In addition, the disposition of the anode and cathode can be reversed.

The organic phosphorescent layer of the organic EL panel 10 includes a structure in which a film is formed using a conductive high polymer material, such as "Baytron P" (a mixture of polyethylene dioxythiophene and polystyrene sulphonic acid) by Bayer Incorporated as a positive hole injection layer, and then a phosphorescent polymer material having π conjugated bonds, such as a polyfluorene system or a poly para-(phenylene vinylene) system, is laminated as a phosphorescent layer, and is formed by, for example, an ink jet method.

The sealant substrate of the organic EL panel 10 prevents penetration of oxygen and water into the organic EL panel 10 and physically protects the organic EL element itself. A two-liquid epoxy thermosetting resin or a UV setting resin can be used as a sealant (adhesive), and this is applied to a specified sealant substrate and sealed. Moreover, glass, and in particular, in the case that light is emitted from the substrate side, a non-transparent metallic member can be used as a material for the sealant substrate.

In addition, the liquid crystal panel 20 is structured from a liquid crystal that is sequentially laminated on one surface of the opposing substrate for the liquid crystal and TFTs (Thin Film Transistors) to drive the liquid crystal. Like the organic EL panel 10, this liquid crystal panel 20 also is a dot matrix type display, and the driver method can either be by the active matrix method or the passive matrix (the simple matrix) method.

The patterning method of the organic EL elements is not particularly limited, but in the case that the organic material that emits each of the colors is a low molecular organic material, the method of using mask vapor deposition under a high vacuum is preferable, and in the case that the organic material that emits each of the colors is a polymer material, a method wherein the organic material is dissolved into a solvent and patterned by an ink jet method is preferable.

The liquid crystal panel 20 in the present embodiment is for a translucent type, and thus an inorganic LED back light is used as illumination. However, the embodiment is not limited thereby, and organic EL elements may be used for illumination.

In addition, the liquid crystal panel 20 in the present embodiment is a translucent type, but is not limited thereby. A reflective liquid crystal display device can be used, and a front light can be used for illumination.

Figure 3:
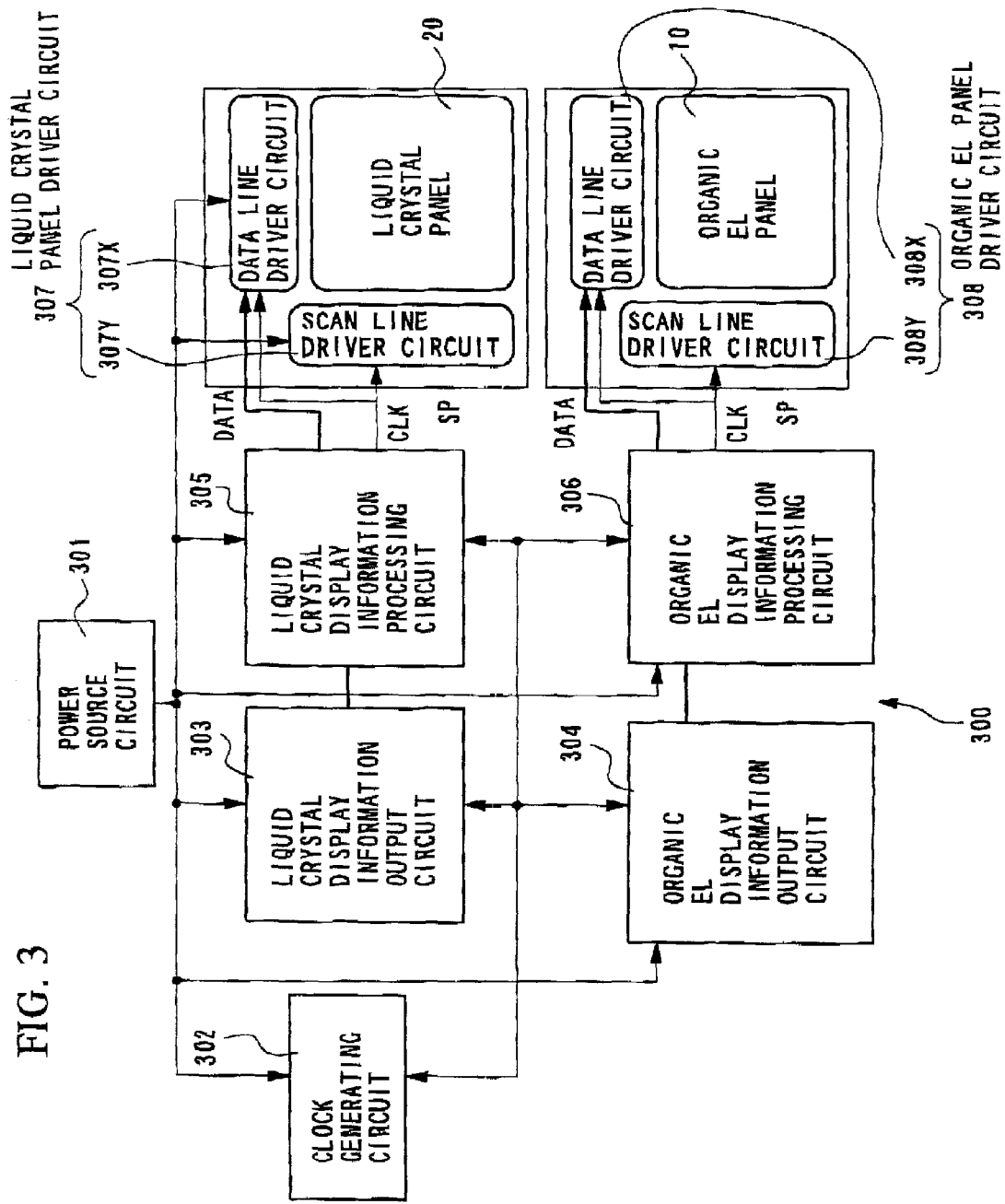
FIG. 3 is a block diagram showing one example of the structure of a control apparatus and a driving circuit in the electronic apparatus of the present invention.

FIG. 3 is a block diagram showing one example of the structure of the control apparatus and the driver circuits in the electronic apparatus 100 of the present invention.

The electronic apparatus (mobile terminal) 100 of the present invention includes a control apparatus 300 in the display (the organic EL panel and liquid crystal panel), a driver circuit 307 for the liquid crystal panel, and a driver circuit 308 for the organic EL panel.

The control apparatus 300 includes a power circuit 301, a clock generating circuit 302, a liquid crystal display information output circuit 303, an organic EL display information output circuit 304, a liquid crystal display information processing circuit 305, and an organic EL display information processing circuit 306, and the operations of the liquid crystal panel driver circuit 307 and the organic EL panel driver circuit 308 are controlled by this control apparatus.

Here, the liquid crystal display information output circuit 303 stores the display information (the primary display information), for example, the time and wallpaper, that must always be displayed while the power is supplied, and as the occasion demands, this stored display information is supplied to the liquid crystal display information processing unit 305. The organic EL display information output circuit 304 stores display information (secondary information) that displays moving images showing several types of animated character figure displays determined in advance and the clock display, and as the occasion demands, this stored display information is supplied to the organic EL display information processing circuit 306.

In addition, the liquid crystal display information processing circuit 305 and the organic EL display information processing circuit 306 perform processing, such as converting the display information supplied respectively from the liquid crystal display information output circuit 303 and the organic EL display information output circuit 304 into a sequence that is appropriate for the display.

Furthermore, the liquid crystal panel driver circuit 307 and the organic EL panel driver circuit 308 provide data line driver circuits 307X and 308X and scan line driver circuits 307Y and 308Y. In addition, the data line driver circuits 307X and 308X and the scan line driver circuits 307Y and 308Y are operated, and the data line and the scan line are driven depending on the display data supplied from the liquid crystal display information processing circuit 305 and the organic EL display information processing circuit 306.

Here, in the control apparatus 300 of the present embodiment, when the power is supplied from the power circuit 301, the time count is performed based on information from the clock generating circuit 302, and each type of information (primary display information), such as the clock display or a static stand-by image, are output from the liquid crystal display information output circuit 303 to the liquid crystal display information processing circuit 305. Next, in the liquid crystal display information processing circuit 305, each type of display information, such as the clock display or a static stand-by image, are sent to the liquid crystal panel driver circuit 307 after performing processing, such as converting them to data sequences that are suitable for the display. Then, depending on this display data, by applying the voltage to the data line driver circuit 307X and the scan line driver circuit 307Y, the clock display and static stand-by image are displayed on the liquid crystal panel 20.

In contrast, in the case that each of the types of display information (secondary display information), such as the video display of a animated character figure display or dark display, is processed, the secondary display information, such as the video display of a animated character figure display or dark display, is output from the organic EL display information output circuit 304 to the organic EL display information processing circuit 306 based on the time count from the clock generating circuit 302. Next, in the organic EL display information processing circuit 306, each type of display information, such as the animated character figure display and clock display, are sent to the organic EL panel driver circuit 308 after performing processing, such as transforming them to data sequences that are suitable for the display. Then, depending on this display data, by applying a voltage to the data line driver circuit 308X and the scan line driver circuit 308Y, the video of the animated character figure display and the display during dark display are displayed on the organic EL panel 10.

In the control apparatus 300 of the present embodiment, while power is supplied, the clock display and stand-by image that must always be displayed are displayed on the liquid crystal panel 20 by the liquid crystal panel driver circuit 307, and the clock display displayed during dark display and the videos of animated character figure displays displayed during an event occurrence are displayed on the organic EL panel 10 by the organic EL panel driver circuit 308.

Moreover, in the case that the organic EL panel and the liquid crystal panel must display simultaneously, either one of the displays can be suspended.

In this case, when always-on displays, such as the stand-by image and the clock, are necessary, the display is performed in the liquid crystal panel 20, which can display at low power consumption, and when a superior image display, video display, or dark display is necessary, display can be performed in the organic EL panel 10, which can display with high responsiveness, a wide directionality, and a high contrast ratio. In this manner, the problem of energy consumption that occurs when using the organic EL panel 10 is enhanced.

First Modification of the Embodiment

In the first embodiment of the control apparatus 300, the liquid crystal panel driver circuit 307 and the organic EL panel driver circuit 308 are driven simultaneously, irrespective of whether or not the liquid crystal panel 20 and the organic EL panel 10 are displaying simultaneously.

In the display of the present modification, by driving the liquid crystal panel driver circuit 307 and the organic EL panel driver circuit 308 simultaneously, video, such as the animated character figure displays displayed by the organic EL panel 10, are displayed on the display of the stand-by image, wallpaper, background, clock, or the like displayed by the liquid crystal panel 20. That is, the liquid crystal panel 20 and the organic EL panel 10, which have different display information, display simultaneously, and two different displays can be simultaneously displayed.

In this manner, different image displays are formed on the liquid crystal panel 20 and the organic EL panel 10, and the liquid crystal display driver circuit 307 and the organic EL panel driver circuit 308 are simultaneously driven, and thereby, a video display can be realized that has a high speed responsiveness, a wide directionality, and a high contrast ratio, and at the same time, low energy consumption by the liquid display panel 20 can be realized.

Second Embodiment

Figure 4:
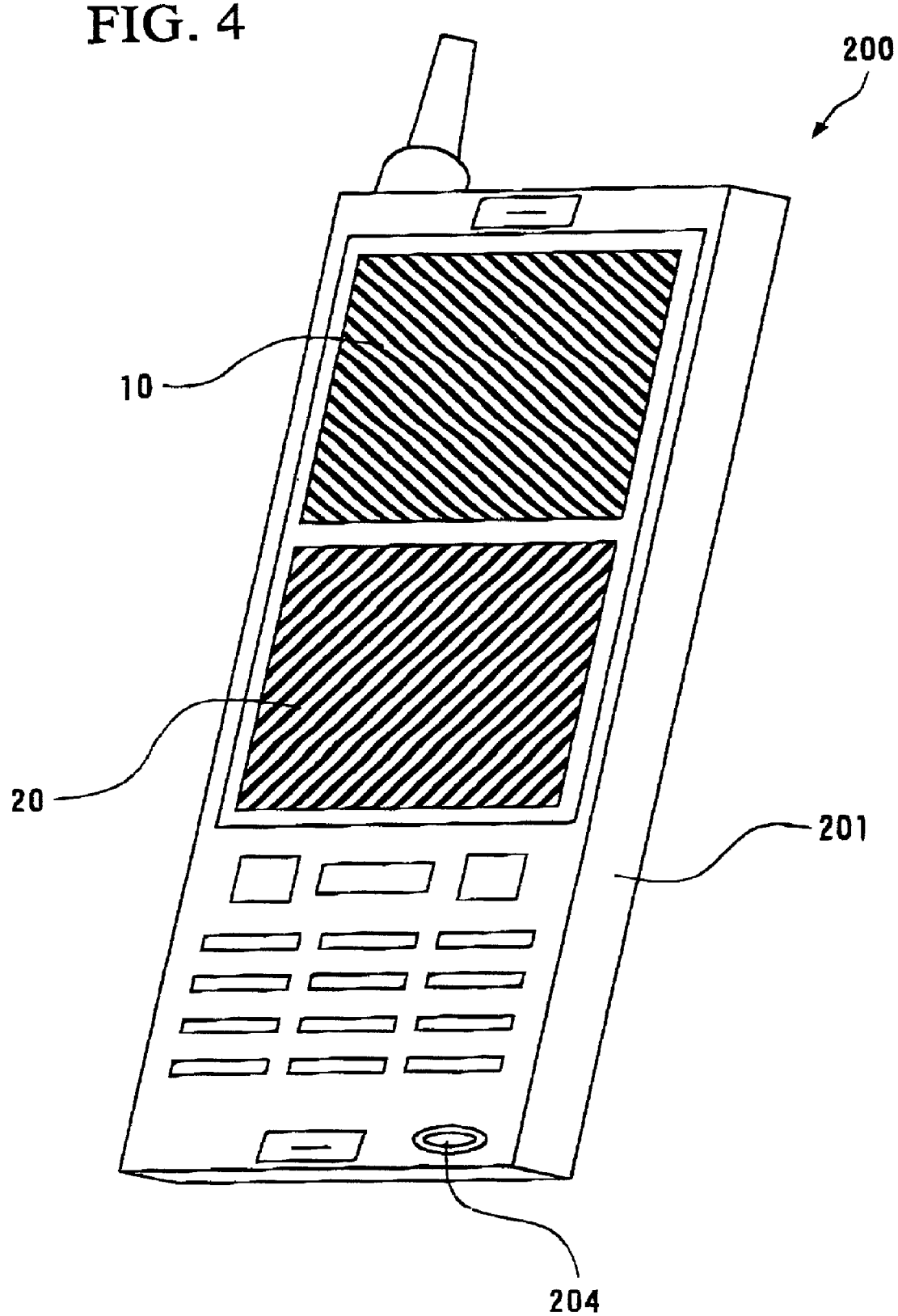
FIG. 4 is a schematic perspective view of the electronic apparatus of the present invention.
Figure 5:
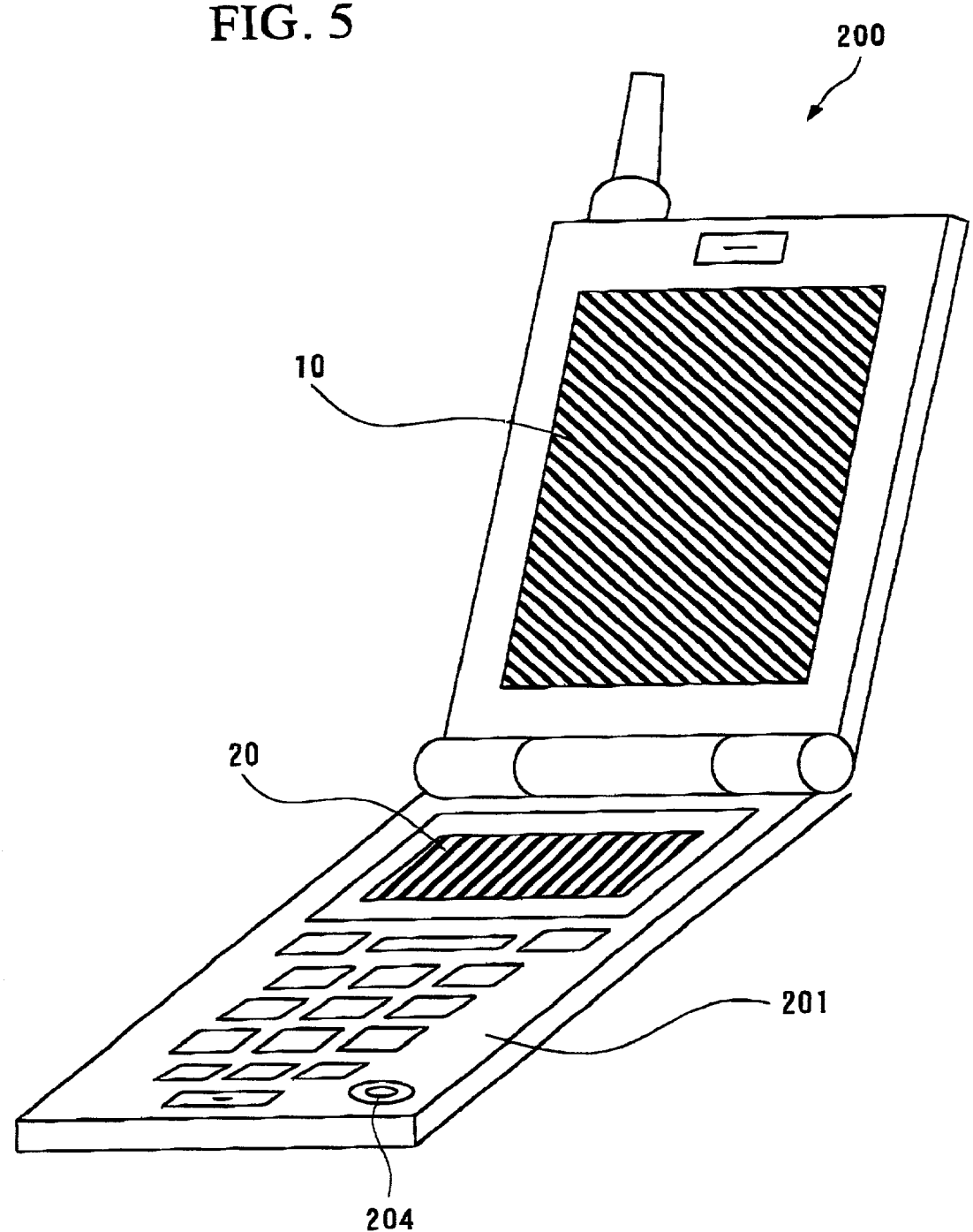
FIG. 5 is a schematic perspective view of the electronic apparatus of the present invention.
Figure 6:
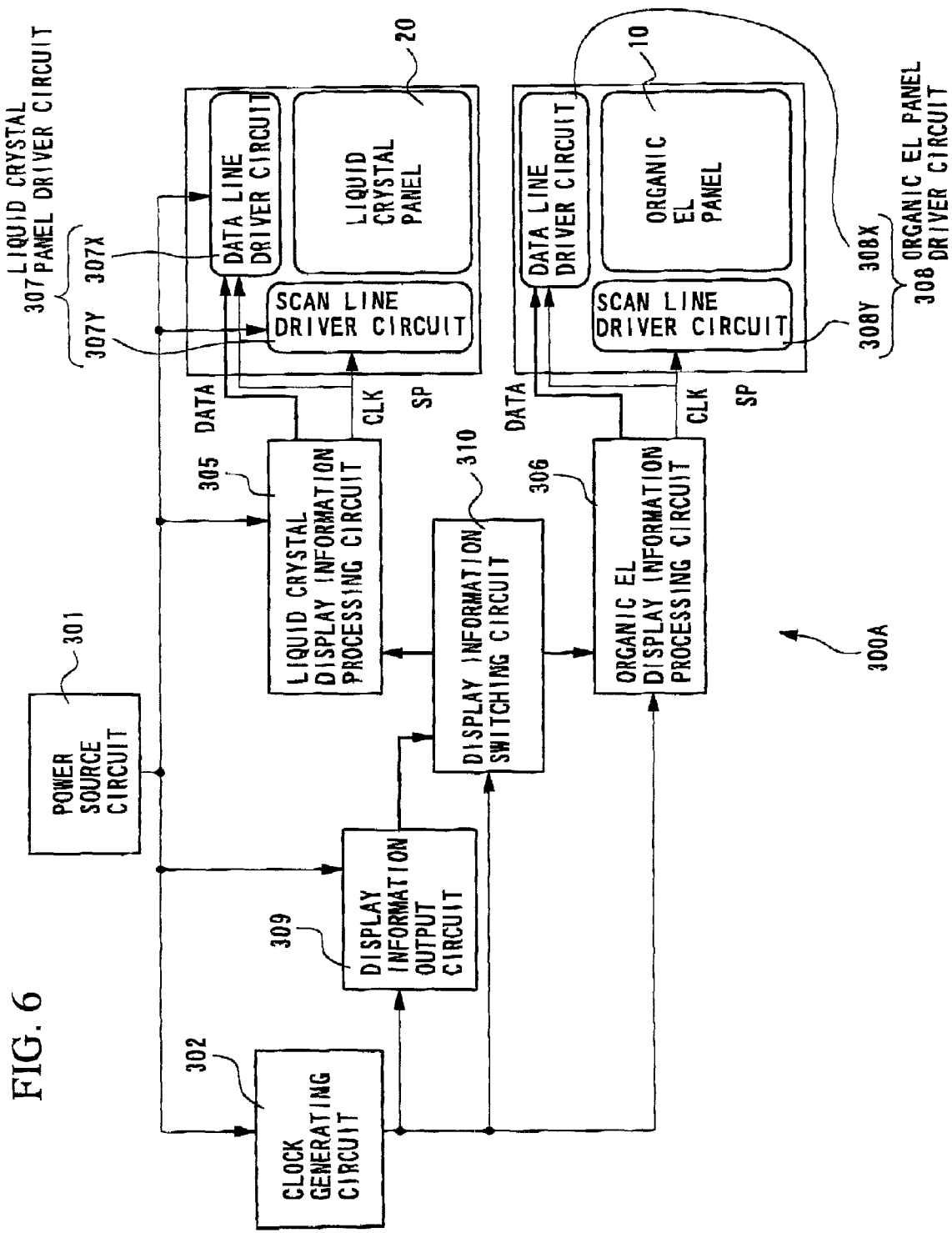
FIG. 6 is a block diagram showing another example of the structure of the control apparatus and the driver circuit in the electronic apparatus of the present invention.

Below, the second embodiment of the present invention will be explained while referring to FIG. 4, FIG. 5, and FIG. 6. FIG. 4 is a schematic perspective view of the body of the mobile terminal electronic apparatus of the present embodiment, FIG. 5 is a schematic perspective view of the body of the folding-type mobile terminal electronic apparatus of the present embodiment, and FIG. 6 is a block diagram showing an example of the structure of the control apparatus and the driver circuits according to the present embodiment.

The mobile terminal electronic apparatus (portable telephone) 200 of the present embodiment has a built in a mobile terminal telephone apparatus body 201, an organic EL display (organic EL panel) 10 that has a full color active matrix display, and a transflective liquid crystal display device (liquid crystal panel) 20 that is a full color active matrix display.

The organic EL panel 10 of the present embodiment is similar to that of the first embodiment.

The liquid crystal panel 20 of the present embodiment is an active matrix that is driven by a low temperature poly-silicon TFTs, but is not limited thereby, and it can also be driven by an amorphous silicon TFT or the like.

In addition, the liquid crystal panel 20 of the present embodiment is a translucent type and performs full color display, and thus an inorganic LED white light-emitting backlight is used for illumination. However, the embodiment is not limited thereby, and a white light emitting organic EL element can also be used for illumination.

In addition, the liquid crystal panel 20 of the present embodiment is a translucent type, but is not limited thereby, and a reflective liquid crystal display device may be used, or a white-light front light can be used for illumination.

In FIG. 6, in the control apparatus 300A of the displays (the organic EL panel 10 and the liquid crystal panel 20), the liquid crystal display information output circuit 303 and the organic EL display information output circuit 304 in the driving apparatus 300 of the first embodiment functionally serve as one display information output circuit 309, and at the same time, a display information switching circuit (switching mean) 310 that can selectively output the display information output from this display information output circuit 309 to either the liquid crystal display information processing circuit 305 that controls the liquid crystal panel driver circuit 307 or the organic EL display information processing circuit 306 that controls the organic EL panel driver circuit 308.

Here, based on the time information, if the display information switching circuit 310 is set so as to switch from the organic EL display information processing circuit 306 to the liquid crystal display information processing circuit 305 so that, for example, when the organic EL panel 10 is displaying continuously for a predetermined time interval while not in use, the liquid crystal panel 20 automatically displays, then a lower energy consumption can be realized.

In addition, if the display information switching circuit 310 is set so as to switch from the liquid crystal display information processing circuit 305 to the organic EL display information processing circuit 306 so as to automatically display in the organic EL panel 10 when the display using the liquid crystal panel 20 becomes a dark display, which is difficult for a user to see depending on the brightness in the vicinity of the portable telephone 200, for example, then even during dark display, a display with superior viewing characteristics can be realized.

Furthermore, if the display information switching circuit 310 is set so as to switch from the organic EL display information processing circuit 306 to the liquid crystal display information processing circuit 305 so as to stop displaying with the organic EL panel 10, which has a large power consumption, and switch to the liquid crystal panel 20, which has a low power consumption, based on the remaining battery capacity, for example, at an arbitrary point in time when the remaining battery capacity has become small, then use of an electronic apparatus, such as a portable telephone 200, can be realized.

The mobile terminal electronic apparatus 200 of the present embodiment provides a switch (switching device) 204 that switches the display between the organic EL panel 10 and the liquid crystal panel 20, and thus it is possible to determine the use selectively depending on the type of information, such as video or static image, the remaining capacity of the battery, or whether or not there is a battery charge apparatus. Moreover, the setting position of the switch 204 is not limited by the present embodiment.

In addition, if the display information switching circuit 310 is set so as to allow free switching between the organic EL display information processing circuit 306 and the liquid crystal display information processing circuit 305, so that, for example, information that the user needs is displayed on the organic EL panel 10 and information that the user does not need is displayed on the liquid crystal panel 20 based on the operation of the switch 204 by the user, then a display layout depending on the user's taste can be realized.

Specifically, initially the clock display and the stand-by image displayed using the liquid crystal panel 20 are displayed on the organic EL panel 10 or initially the video displayed by the organic EL panel 10 can be displayed by the liquid crystal panel 20. Thus, the degree of freedom of the display layout can be increased.

In addition, when the remaining battery charge becomes low due to the display information switching circuit 310, the control apparatus 300A can suspend the display of the organic EL panel, which has a high-energy consumption level, at an arbitrary point in time, and can automatically switch to the display of the liquid crystal panel. In addition, when the organic EL panel is activated, if an unused state continues, the display can be automatically switched to the liquid crystal panel.

In addition, the mobile terminal electronic apparatus of the present embodiment can select the display during stand-by from between either a display by the organic EL panel and a display by the liquid crystal panel.

The control apparatus 300A according to the second embodiment can be adapted to the mobile terminal electronic apparatus 100 according to the first embodiment.

That is, the mobile terminal electronic apparatus according to the first embodiment is a folding type, and in the folded state shown in FIG. 2, based on the display information switching circuit 310, the organic EL panel 10 can be automatically turned OFF, and during the stand-by time, the liquid crystal panel 20 displays only the minimal necessary information. Therefore, the power consumption during the stand-by time is only the power necessary to drive the liquid crystal panel 20.

In addition, while the power of the body is ON, when the mobile terminal electronic apparatus 100 according to the first embodiment is opened as shown in FIG. 1 from the folded state shown in FIG. 2, based on the display information switching circuit 310, the power source of the organic EL panel 10 can be automatically turned ON.

In addition, when a device that stores information before the power of the organic EL panel 10 is turned OFF is provided on the mobile terminal electronic apparatus 100 of the present embodiment, and the power or the organic E1 panel 10 is turned back ON, the information that existed immediately prior to being turned OFF can be displayed.

As shown in FIG. 5, a switch 204 can be provided on the folding-type mobile terminal electronic apparatus 200. In this mobile terminal electronic apparatus 200, like the first embodiment, the power source of the organic EL panel 10 and the liquid crystal panel 20 is turned OFF when in the folded state. In addition, when the power source of the body is ON, when opened from the folded state, the power source of the organic EL panel 10 automatically turns ON. Furthermore, by manipulating the switch 204, the power of the organic EL panel 10 can be turned ON and OFF. That is, the mobile terminal electronic apparatus 200 shown in FIG. 5 is a structure that has a folding part (hinge part) and a switch 204 that serve as a device to switch the display.

Modification of the Second Embodiment

In the control apparatus 300A of the second embodiment, as a display information output circuit 309, a liquid crystal display information output circuit 303 and an organic EL display information output circuit 304, like the control apparatus 300 of the first embodiment, are provided, and normally control is performed like that of the first embodiment. For example, in the case that predetermined selection conditions are provided based on the time information, brightness, remaining battery charge, the operations of the user, or the like, it is also possible to activate the display information switching circuit 310.

That is, normally the display information stored in the liquid crystal display information output circuit 303 is supplied to the liquid crystal display information processing circuit 305, and is displayed on the liquid crystal panel 20 by activating the liquid crystal driver circuit 307. At the same time, the display information stored in the organic EL display information output circuit 304 is supplied to the organic EL display information processing circuit 306, and is displayed on the organic EL panel 10 by activating the organic EL panel driver circuit 308. In addition, in the case that predetermined selection conditions, such as the time information, brightness, remaining battery charge, or operation by the user, for example, are provided, the display information stored in the liquid crystal display information output circuit 303 is supplied to the organic EL display information processing circuit 306 by the display information switching circuit 310, and displayed on the organic EL panel 10, or alternatively the display information stored in the organic E1 display information output circuit 304 is supplied to the liquid crystal display information processing circuit 305 by the display information switching circuit 310, and displayed on the liquid crystal panel 20.

In addition, both the display information stored in the liquid crystal display information output circuit 303 and the display information stored in the organic EL display information output circuit 304 can be supplied to the liquid crystal information processing circuit 305 by activating the display information switching circuit 310, and displayed on the liquid crystal panel 20. Similarly, both the display information stored in the liquid crystal display information output circuit 303 and the display information stored in the organic EL display information output circuit 304 can be supplied to the organic EL display information processing circuit 306 by activating the display information switching circuit 310, and can be displayed on the organic EL panel 10.

Third Embodiment

Figure 7:
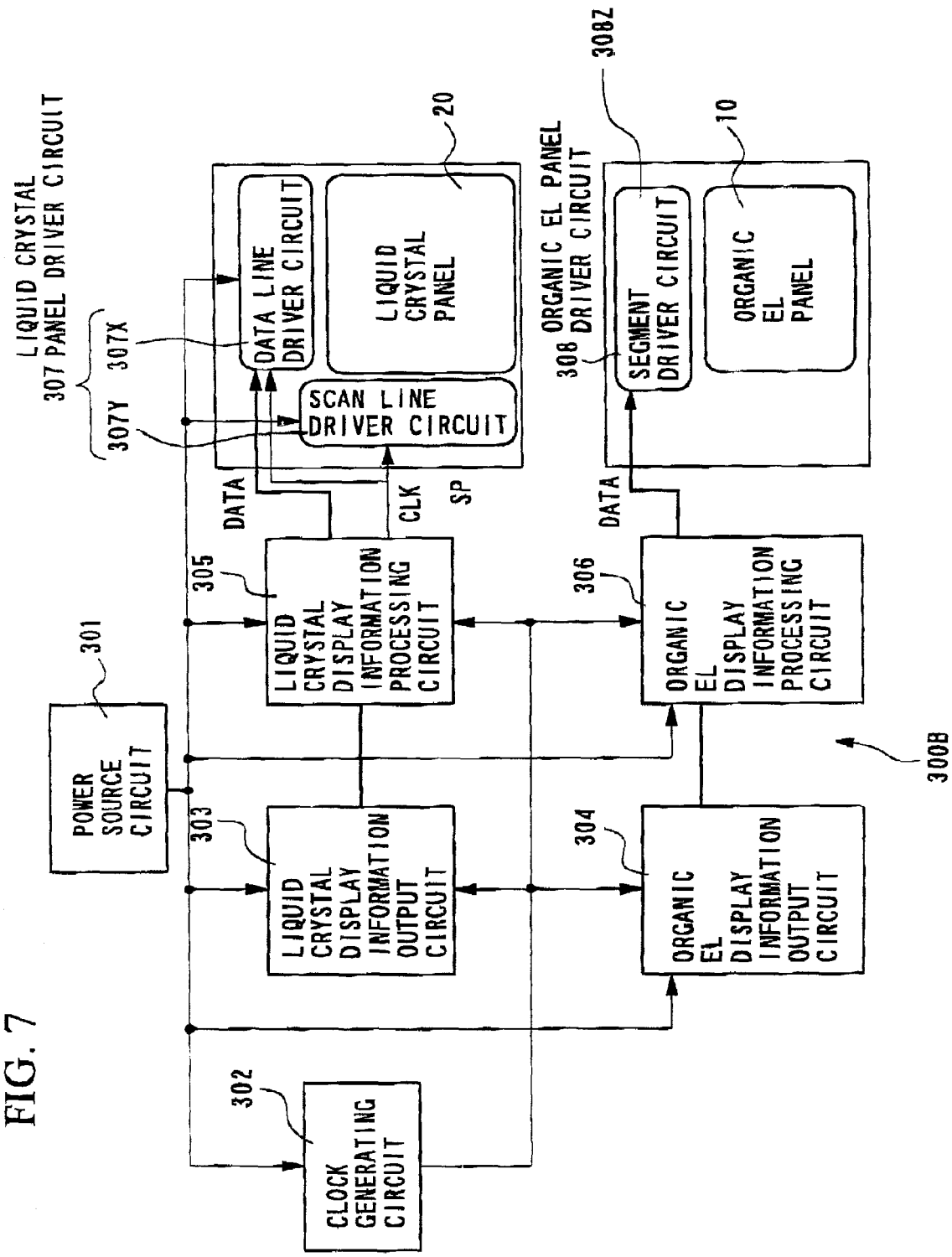
FIG. 7 is a block diagram showing another example of the structure of the control apparatus and the driver circuit in the electronic apparatus of the present invention.

FIG. 7 is a block diagram showing another example of the structure of the control apparatus and driver circuits in an electronic apparatus of the present invention.

In the display, the organic EL panel 10 that has a structure similar to that in the first embodiment has a segmented display body, and is activated by a passive method.

Here, as shown in FIG. 7, in the organic EL panel driver circuit 308 in the control apparatus 300B in the present embodiment, by driving a segment driver circuit 308Z formed by a plurality of segment electrodes that extend from individual pixels in the shape of particular numbers, animated character figures, or designs, and one common electrode that opposes the segment electrode, and thereby a particular segment display is displayed on the organic EL panel 10.

In this manner, while power is supplied to the display of the stand-by image and the clock, the display information that must be always displayed is displayed by the liquid crystal display panel 20, which has a low power consumption, and at the same time, the constant display information requiring a comparatively low energy consumption, such as the clock display on the dark display and the alarm display during events, are displayed by the organic EL panel 10, and thus electronic apparatus, such as portable telephones 200, can be driven at a lower power consumption.

Another Embodiment

In the embodiment described above, a portable telephone (mobile terminal electronic apparatus) that has an organic EL panel 10 and a liquid crystal panel 20 built-in as an example of an electronic apparatus was explained, but in addition to this, examples of an application to a mobile personal computer, digital still camera, etc. will be explained referring to FIG. 8 and FIG. 9.

Figure 8:
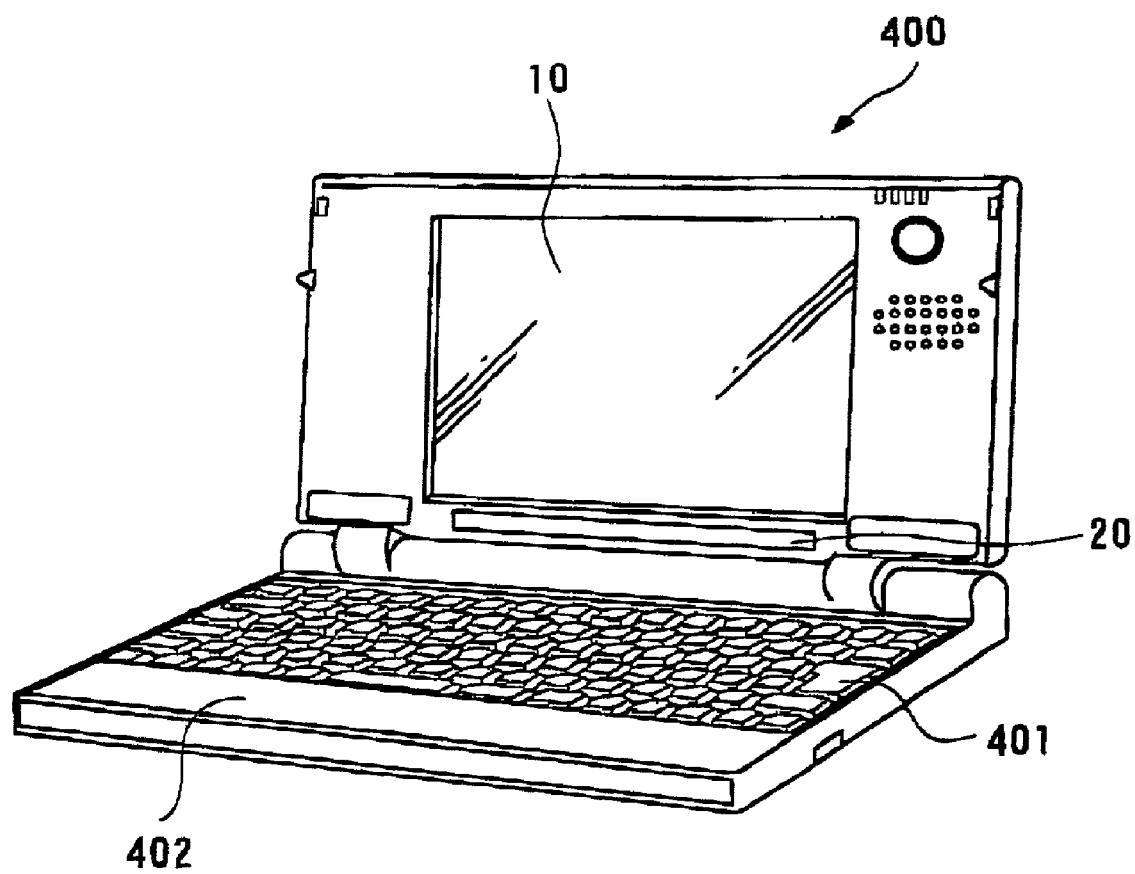
FIG. 8 is a schematic perspective view showing a mobile-type personal computer as another example of an electronic apparatus of the present invention.

FIG. 8 is a perspective view showing a mobile-type personal computer.

The mobile-type personal computer 400 includes a body 402 that provides a keyboard 401, an organic EL panel 10, and a liquid crystal panel 20. The organic EL panel 10 displays predetermined display information as the main display part. In contrast, the liquid crystal panel 20 displays auxiliary (sub) display information, such as the time or email arrival information. Moreover, a structure is also possible wherein the liquid crystal panel is be used as the main display and the organic EL panel is used as the sub-display.

Figure 9:
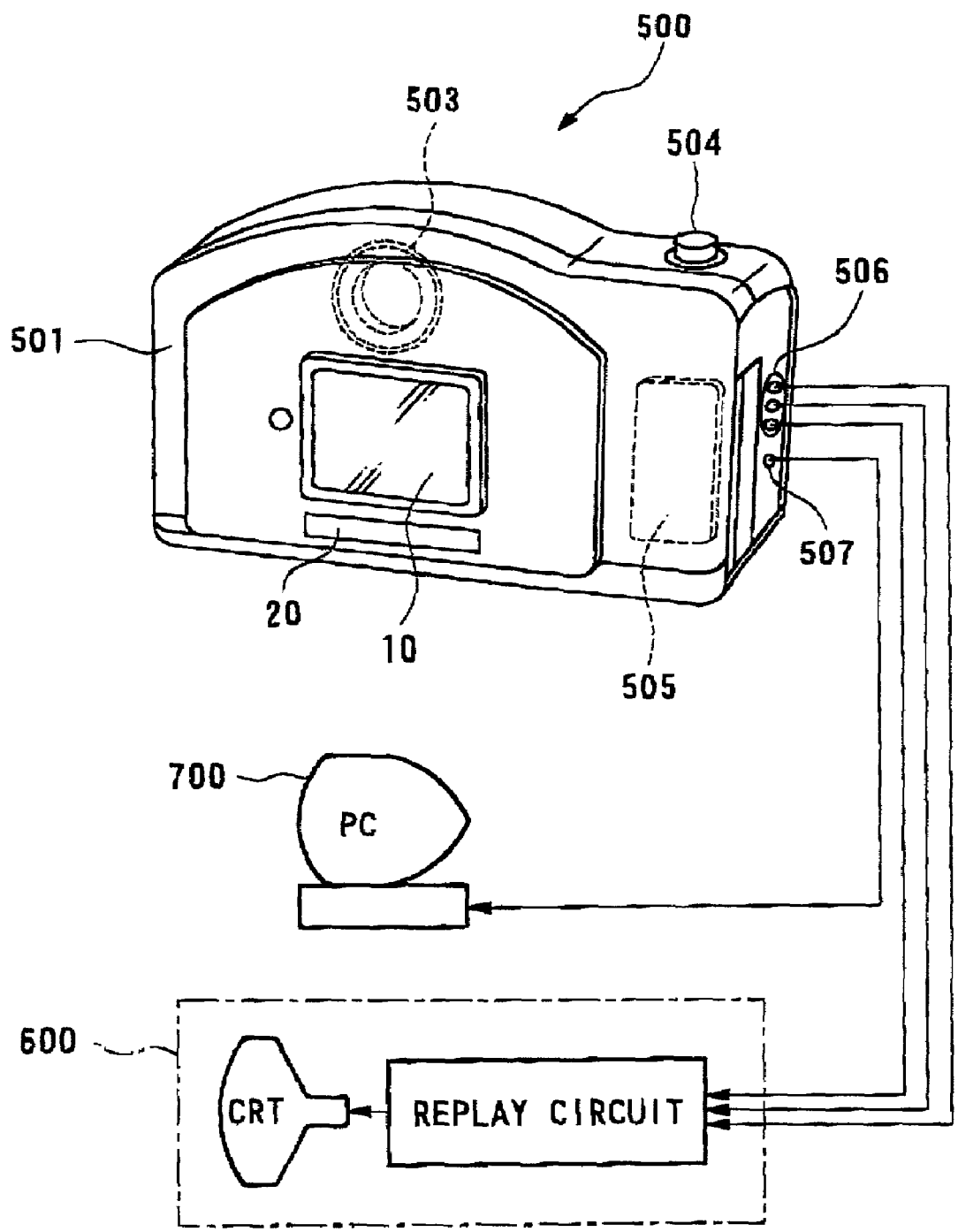
FIG. 9 is a schematic perspective view showing a digital still camera as another example of an electronic apparatus of the present invention.

FIG. 9 is a perspective view showing a digital still camera.

The digital still camera 500 includes a case 501, the organic EL panel 10 described above provided on the bask surface thereof, a liquid crystal panel 20, a light receiving unit 503 that includes an optical lens and a CCD (Charge Coupled Device) provided on the viewing side of the case 501, a shutter button 504, and a circuit board 505 on which the image signals of the CCD generated when the shutter button 504 is pressed are transmitted and stored. In the organic EL panel 10, display based on the photograph signal can be performed, and in the liquid crystal panel 20, supplementary information, such as the date and time, can be displayed. In addition, in this digital still camera 500, the video signal input terminal 506 and the input/output terminal 507 for data transmission are provided on the side of the case 501, and a television monitor is connected to the former video signal output terminal 506 as needed, and a personal computer is connected to the input/output terminal 507 for data transmission as needed.

Moreover, while not limiting, examples of electronic apparatus are televisions, viewfinders, video tape recorders having a direct monitor view, car navigation systems, pagers, electronic schedulers, calculators, word processors, work stations, television phones, POS terminals, and apparatus furnished with touch panels, and mounting the organic EL panel 10 and the liquid crystal panel 20 on any of these devices is possible.

Here, the liquid crystal panel 20 in each of the embodiments described above corresponds to the liquid crystal display in the claims, and the organic EL panel 10 corresponds to the organic electroluminescent device in the claims. In addition, each of the embodiments described above were explained in the case that the mobile terminal electronic apparatus shown in FIGS. 1 and 2 include the control apparatus 300 shown in FIG. 3, and the mobile terminal electronic apparatus 200 shown in FIG. 4 and FIG. 5 include the control apparatus 300A shown in FIG. 6. However, as explained above, the mobile terminal electronic apparatus 100 shown in FIG. 1 and FIG. 2 can include the control apparatus 300A shown in FIG. 6, and the mobile terminal electronic apparatus 200 shown in FIG. 4 and FIG. 5 can include the control apparatus 300 shown in FIG. 3. In addition, the control apparatus 300B shown in FIG. 7 can be applied to the mobile terminal electronic apparatus 100 shown in FIG. 1 and FIG. 2, and the mobile terminal electronic apparatus 200 shown in FIG. 4 and FIG. 5.

As explained above, an electronic apparatus that has a device to display, and in particular in a mobile terminal electronic apparatus, such as a portable telephone that reduces energy consumption, by providing both an organic EL device that has viewing characteristics having superior fineness and a transflective liquid crystal display device that can keep the power consumption low and assigning use, an electronic apparatus having a built in organic EL display can be efficiently used at a low power consumption.

What is claimed is:

1. A mobile terminal comprising:
an organic electroluminescent device to display images;
a liquid crystal device to display images, the mobile terminal being capable of being folded such that the organic electroluminescent device faces inside while the liquid crystal device faces outside, said liquid crystal device being a transflective liquid crystal display device; and
a battery provided in said mobile terminal and a device that suspends displaying images by said organic electroluminescent device and that switches automatically to displaying images by said liquid crystal device, when a remaining charge of the battery provided in said mobile terminal becomes a predetermined remaining charge.

2. The mobile terminal according to claim 1, when not manipulated for a predetermined period or during stand-by, said organic electroluminescent device being in a non-display mode, and only said liquid crystal device being in a display mode.

3. The mobile terminal according to claim 1, said organic electroluminescent device being driven by an active matrix driving method.

4. The mobile terminal according to claim 1, said liquid crystal device being driven by a simple matrix driving method.

5. The mobile terminal according to claim 1, said liquid crystal device being driven by an active matrix driving method.

6. The mobile terminal according to claim 1, said liquid crystal device being a monochrome display.

7. The mobile terminal according to claim 1, said liquid crystal device being a color display.

8. The mobile terminal according to claim 1, further comprising a device that switches display between said liquid crystal device and said organic electroluminescent device.

9. The mobile terminal according to claim 1, further comprising a device that switches display from said organic electroluminescent device to said liquid crystal device when said organic electroluminescent display is not manipulated for a predetermined period while said organic electroluminescent display is continuously driven.

10. The mobile terminal according to claim 1, the organic electroluminescent device including red, green and blue light emitting organic electroluminescent elements.

11. The mobile terminal according to claim 1, the organic electroluminescent display automatically turned OFF when the mobile terminal is folded from the opened state.

12. The mobile terminal according to claim 1, the organic electroluminescent device automatically turned ON when mobile terminal is opened from the folded state.

* * * * *